United States Patent [19]

Meyer et al.

[11] Patent Number: 4,993,114
[45] Date of Patent: Feb. 19, 1991

[54] METHOD AND APPARATUS FOR MECHANICALLY OBTAINING MEAT FROM POULTRY BODIES

[75] Inventors: Detlef Meyer, Lübeck; Heinrich Lindert, Halle; Theo M. Schaarschmidt, Lübeck, all of Fed. Rep. of Germany

[73] Assignee: Nordischer Maschinenbau Rud. Baader GmbH & Co. KG, Lubeck, Fed. Rep. of Germany

[21] Appl. No.: 470,331

[22] Filed: Jan. 25, 1990

[30] Foreign Application Priority Data

Jan. 28, 1989 [EP] European Pat. Off. ........ 89101487.0

[51] Int. Cl.$^5$ ............................................. A22C 25/16
[52] U.S. Cl. ......................................... 452/136; 17/11
[58] Field of Search .............................. 17/46, 11, 1 G

[56] References Cited

U.S. PATENT DOCUMENTS

| 4,557,017 | 12/1985 | Gasbarro | 17/11 |
| 4,648,156 | 3/1987 | Meyn | 17/11 |
| 4,682,386 | 7/1987 | Hazenbroek et al. | 17/11 |
| 4,688,297 | 8/1987 | Bartels | 17/11 |
| 4,827,570 | 5/1989 | Scheier et al. | 17/46 |
| 4,873,746 | 10/1989 | Scheier et al. | 17/11 |

FOREIGN PATENT DOCUMENTS 168865 1/1986 European Pat. Off. .
207553 1/1987 European Pat. Off. .

*Primary Examiner*—Willis Little
*Attorney, Agent, or Firm*—Fay, Sharpe, Beall, Fagan, Minnich & McKee

[57] ABSTRACT

This method makes use of a row of tools arranged along a conveyor provided with receptacles for holding poultry bodies. The design of the tools is aimed at obtaining a high quality end product with a high yield. The processing of the poultry bodies advanced by the receptacles and reliably held therein successively takes place by controllable scrapers, which sever the connection between the outer fillets, on the one hand, and the coracoid bones, the ribs and possibly the inner fillets, on the other, by means of controllable paring knives, which detach the outer fillets from the wing joints and the wishbone, by means of a retaining device detaching the outer fillets in one piece in double fillet form and by means of a tool with scrapers, with the aid of which the inner fillets can be scraped from the skeleton, after the skin surrounding the same has been destroyed by means of a tool.

17 Claims, 4 Drawing Sheets

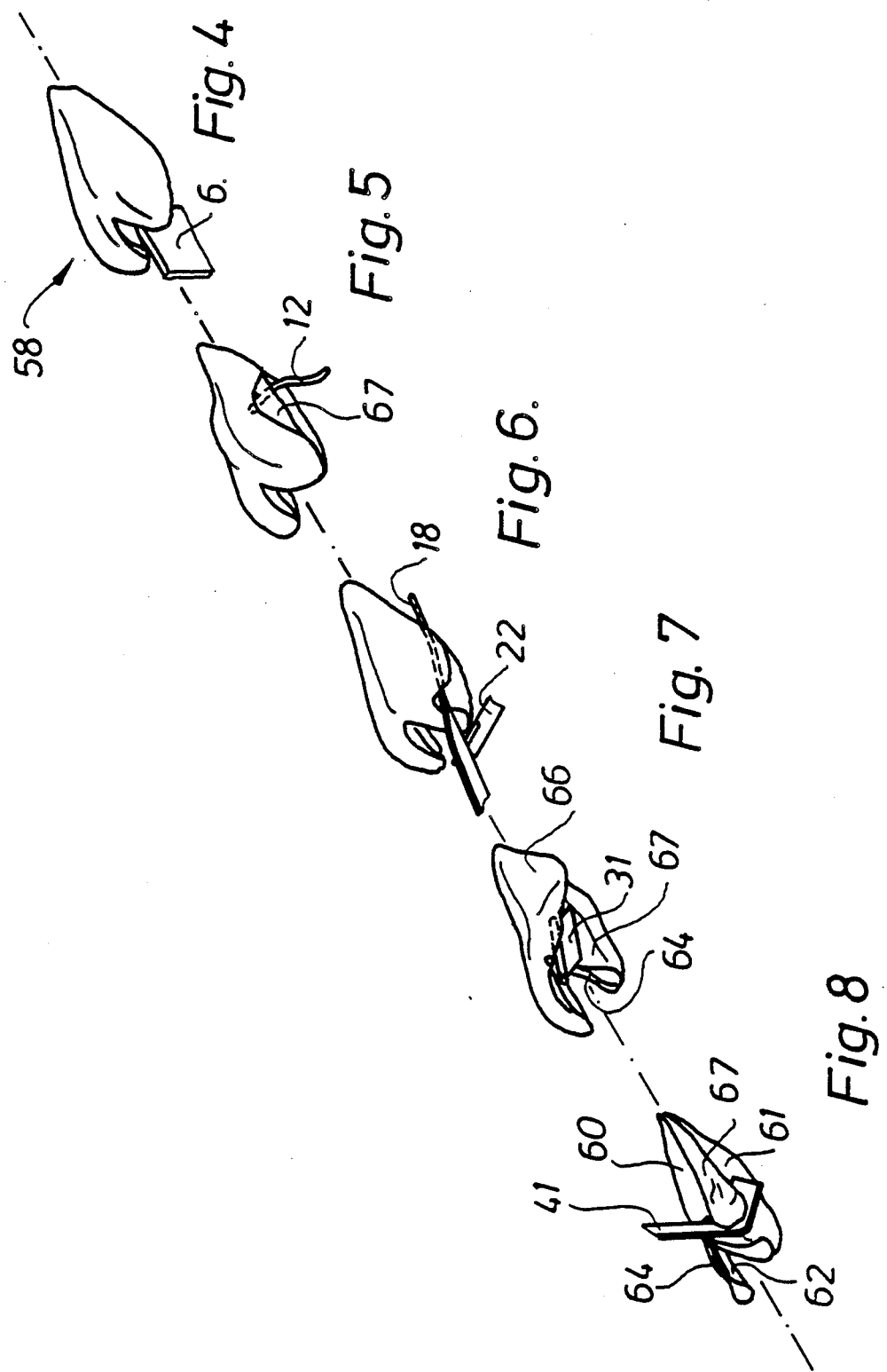

1

METHOD AND APPARATUS FOR MECHANICALLY OBTAINING MEAT FROM POULTRY BODIES

BACKGROUND OF THE INVENTION

1. Field of the Invention

The invention relates to a method for mechanically obtaining meat from the bodies of slaughtered poultry, which bodies are moved past a number of tools, as well as to an apparatus for performing this method with continuously moved conveyors having receptacles for holding the poultry bodies to be processed, as well as tools arranged along the conveyor path for detaching the meat from the skeleton.

2. Prior Art

EP-Al-168 865 discloses an apparatus, which although directed at removing the top part of the wish-bone (clavicula), said processing step, however, preceding a filleting process, which results in a double fillet comprising the breast meat in the form of the outer fillets and the inner fillets. In this apparatus the poultry bodies in the form of front halves are saddled onto the saddles of a conveyor driven in rotary manner, so that a horn of the saddle projects into the neck opening and the breast part is directed upwards. The filleting of the poultry body conveyed with the neck opening leading takes place in the lower run of the apparatus and starts with the retaining of the breast meat and thus the stripping thereof from the wish-hone up to the breast-bone (sternum) and is continued by a scraping tool, which is adapted to the poultry body shape and which brings about the separation of the meat up to the breast-bone comb (crista sterni) by penetrating between the skeleton and the meat. Following scraping fingers bring about the detachment from the sides of the breast-bone in its transition region to the breast-bone plate (corpus sterni) and finally the complete separation of the double fillet by means of paring belts driven in rotary manner.

According to a further embodiment of this prior art document a first filleting tool is constituted by a pair of milling or cutting rollers, which raise from the skeleton the fillet meat located in the vicinity of the ribs. This tool is followed by a scraping tool of the type described hereinbefore and which brings about the separation of the meat up to the breast-hone comb. A tool comprising paring belts driven in rotary manner finally carries out the complete separation of the double fillet.

EP-Al-207 553 discloses a further apparatus for obtaining meat from poultry bodies in the form of double fillets. Here again the starting product is the front half of a poultry body, which is inverted or pushed onto the saddle horn of a saddle forming part of a revolving conveyor. During the saddling the wing joints and therefore the attachment points of the wish-bone are kept inwardly displaced and the poultry body is delivered in this way to the filleting tools arranged along the bottom strand of the conveyor and the fillet meat is essentially obtained by sliding off.

The products resulting from these known methods do not meet the requirements regarding their optical impression, which results both from the contour and from the manner in which the separation surface is produced.

3. Objects of the Invention

The main object of the invention resides in improving such methods and devices for obtaining fillets from poultry bodies with regard to the above requirements and criteria.

In such improvement, it is a particular object to obtain an optically attractive product.

It is a further essential object to achieve this with maximum fillet meat yield.

SUMMARY OF THE INVENTION

These objects are achieved by a method in which the bodies are present in a form freed from their extremities and the skeleton essentially comprises the breast-bone (sternum) constituted by the comb or crest (crista sterni) and the breast-bone plate (corpus sterni), and the wing joints carried by the coracoid bones (coracoidae) with the wish-bone (clavicula), as well as possibly at least parts of the ribs, which bodies are conveyed with the wing joints leading and in their longitudinal direction with an orientation of the part of the breast-bone plate (corpus sterni) facing the body cavity substantially parallel to the conveying direction, by the method steps of (a) releasing the outer fillets from the coracoid bones and from any ribs, as well as the connections between the outer fillets and the inner fillets, essentially up to the crest (crista sterni) of the breast-bone, (b) severing the connection between the outer fillets and the wing joints while detaching the outer fillets from the wish-bone, (c) tearing off the two outer fillets from the crest of the breast-bone in one piece, (d) tearing the skin surrounding the inner fillets, and (e) stripping the inner fillets from the skeleton The product resulting from this method comprises the outer fillets as double fillets and the inner fillets separated therefrom.

If, however, the meat is to be obtained in one piece, i.e. in the form of the outer fillets as a double fillet surrounding the inner fillets adhering thereto, these above objects are achieved by a modified method comprising a modified method step (a), in which the detachment of the meat is related to the outer fillets and the inner fillets; detaching the meat from the sides of the crest of the breast-bone prior to performing method step (b); and then carrying out method step (c), in which the inner fillets are also included.

To achieve the objects set out above, there is also an apparatus comprising a continuously moving conveyor with receptacles for holding the poultry bodies to be processed, as well as tools for releasing the meat from the skeleton arranged along the conveyor path, which apparatus comprises a sequence of severing tools for performing the single method steps subsequently, at least part of which tools is arranged along the lower run of the conveyor. The tools are arranged such that in an early tool station the outer and inner fillets may either be scraped off the skeleton separate from each other to obtain an outer double fillet and two inner fillet pieces or be detached from the skeleton together to result in a one piece double fillet in which the two outer and inner fillets adhere to each other.

The advantages resulting from the invention lie essentially in minimum stressing of the meat, because the individual tools are so constricted in their working area, that they can be readily adapted to the anatomical conditions. This results in reliable, careful working, an attractive product, and high productivity and yield.

BRIEF DESCRIPTION OF THE DRAWINGS

Other and further objects of the present invention will be apparent from the following description and claims and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings

FIGS. 4 to 8 each show axonometric representations of the individual working stages after carrying out method steps (a) to (e) shown in each case as being performed on only one side.

DETAILED DESCRIPTION OF THE PREFERRED EMBODIMENTS

Figure 1:
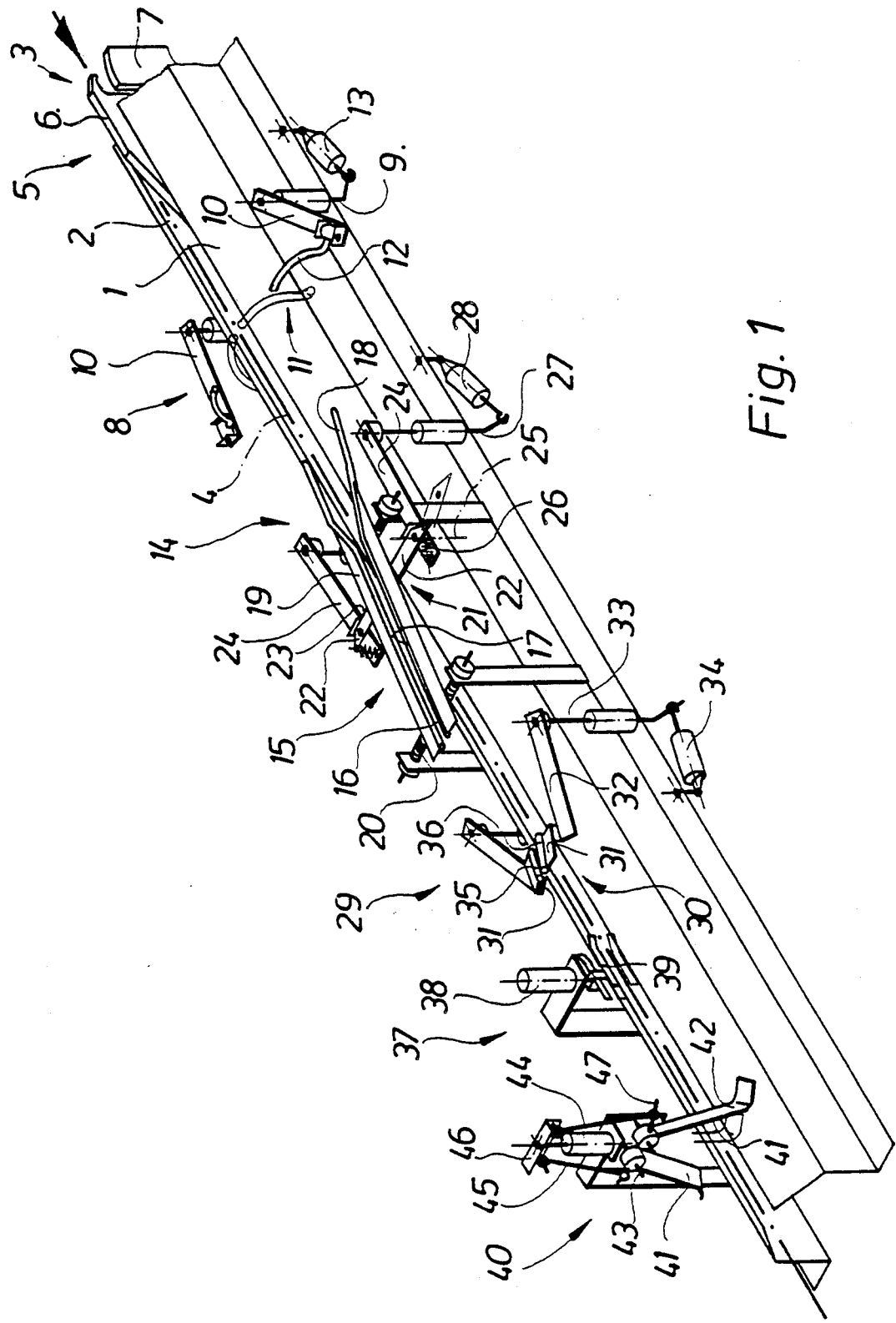
FIG. 1 shows a simplified overall view of the apparatus according to the invention in axonometric form.

The apparatus according to the invention is installed on a machine frame, of Which, in order not to overburden the drawing, FIG. 1 only shows the part covering the working area. In this area there is a pair of guide profiles 1 sloping towards one another in roof-like manner and having a gap 2 in the vicinity of the ridge line. The profiles 1 extend symmetrically to either side of the path of a conveyor 3. The latter comprises a chain 4 only indicated in its upper strand or run and which is driven continuously in rotary manner in a vertical plane of rotation. The chain 4 is provided with receptacles 5 for holding the poultry bodies 58 (see FIG. 3) to be processed. Each of the receptacles 5 comprises a saddle part 6, which forms with a clamping part 7 a gripper controllable by means of not shown. frame-fixed cam or curved rails. The gripper is brought into a Closed position prior to the entry of the receptacles 5 into the area of the tools by raising the clamping part 7. These tools are arranged in pairs and symmetrically on either side of the path of the conveyor 3.

In this construction, a first tool 8 comprises on either side of the path of the conveyor 3 a lever 10 pivotable about a vertical axis 9 and which at its free end has a scraping tool 11 comprising a scraper 12 in the form of a scraping finger. This finger, in an appropriate, not shown way is mounted so that it can give way upwards against spring tension. A drive provided in the form of a pneumatically driven pivot or swivel cylinder 13 and bringing about the rotation of axis 9 engages the latter. The cylinder 13 is able to elastically pivot the scraper 12 between a position alongside the path of the poultry body 58 and a position crossing the same.

The tool 8 is followed by a second tool 14, which has a guide element 15 on either side of the path of the conveyor 3. The guide elements 15 extend in such a way as to leave a gap 16 narrowing in the conveying direction, rise in closely juxtaposed manner and comprise round bars 17. Each one of the ends 18 thereof directed against the conveying direction is spread outwards, so that each guide element 15 starts above the roof surface of the respective associated guide profile 1. The round bars are designed to extend outwards to form guide surfaces 19 in the vicinity of the gap 16. The guide elements 15 are mounted in such a way that their outward displacement counter to the tension of springs 20 is possible. In the zone of the apparatus comprising the guide elements 15 is also provided a cutting tool 21 with a pair of paring knives 22. Each of the latter is fitted to the free end of a lever 24 and comprises a blade, whose paring edge 23 is oriented substantially perpendicular to the conveying direction and extends in a horizontal plane. Each paring knife 22 is mounted in a vertical axis 25 and can be pivoted in the driving direction of the conveyor 3 against the tension of a spring 26. The other end of the lever 24 is fixed to a vertical axis 27, on which engages a drive in the form of a pneumatically operated pivot or swivel cylinder 28 bringing about the rotation thereof and which is able to elastically pivot the paring knife 22 from a position alongside the path of the poultry body 58 into a position crossing the same. In the pivoted-in position, the paring knives 22 are located directly below the guide surfaces 19 of the guide elements 15.

The tool 14 is followed by a third tool 29 in the form of a retaining device 30 having a pair of clamping elements 31. Each of these is fitted to the free end of a lever 32, whose other end is fitted to a vertical axis 33, on which engages a drive bringing about the rotation thereof and in the form of a pneumatically operated swivel or pivot Cylinder 34. This cylinder is able to pivot the clamping elements 31 from a basic position crossing the path of the poultry bodies 58 to a position alongside said path. The clamping elements 31 have clamping edges 35 which are oriented so as to rise with respect to the path of the poultry bodies 58 and in the conveying direction thereof and form, in the basic position, a clamping gap 36 tapering in V shaped manner in the conveying direction The retaining device 30 is followed by a fourth tool 37, which comprises a pair of skid- or ski-shaped friction elements 39, which can be moved in controlled manner from above into the path of the poultry bodies 58 by a pneumating drive 38.

Finally, a last and fifth tool 40 comprises a pair of scrapers 41, Whose scraping edges 42 are adapted to the cross-sectional contour of the skeleton of the poultry body 58 in the region of the crest 60 of the breast-bone 59 and the breast-bone 61. These scrapers 41 are mounted to be pivoted in scissor-like manner about axes 43 arranged above the path of the poultry bodies 58 and can be moved into the path of said poultry bodies 58 in a controlled manner with the aid of a pneumatic drive 44. Driving is transferred to the scrapers 41 by means of guide rods 45, which form the connection between a drive yoke 46 and control levers 47 arranged on the scrapers 41.

Figure 2:
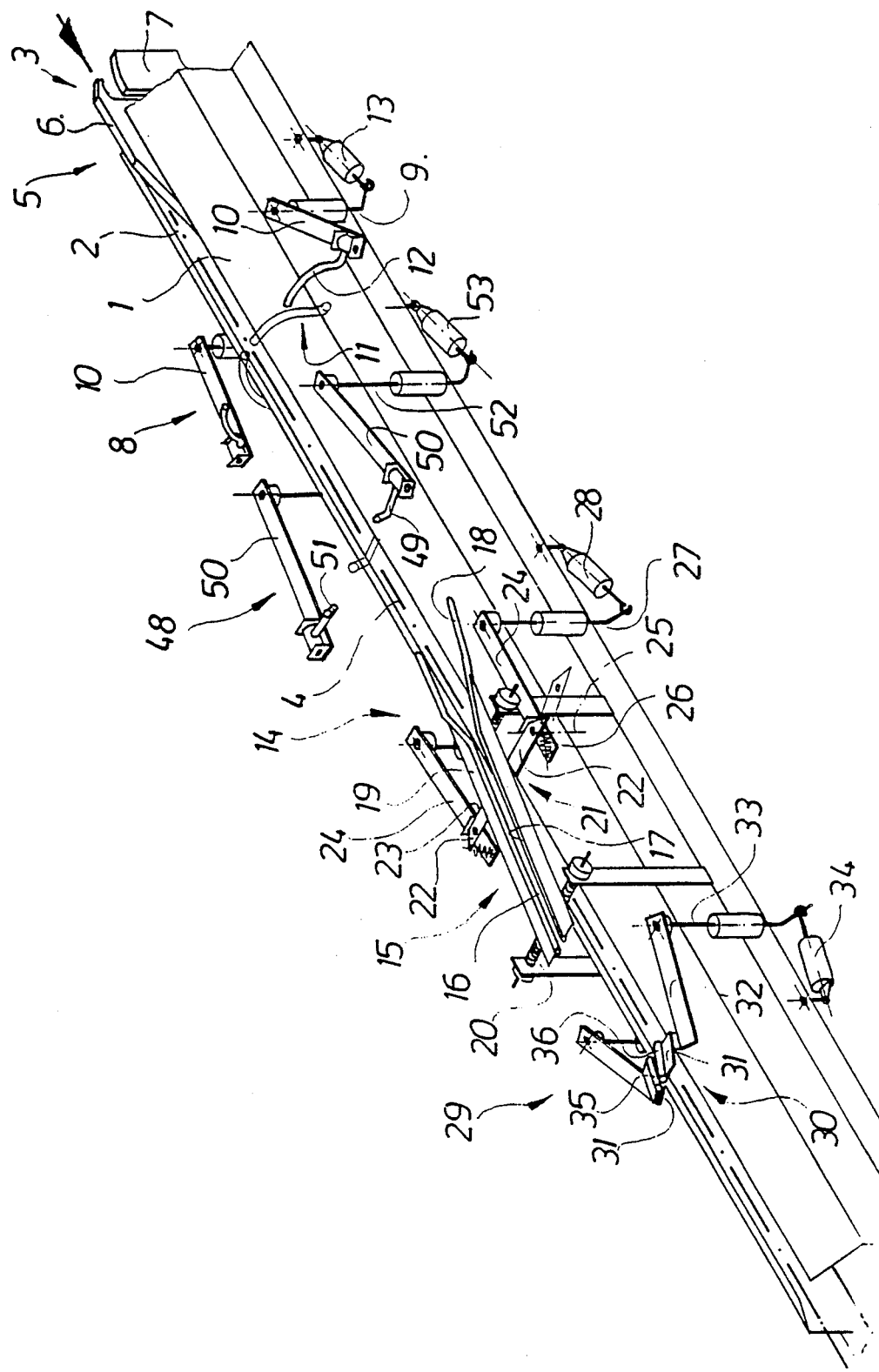
FIG. 2 represents an apparatus according to FIG. 1 for obtaining a double fillet including the inner fillets.

The described apparatus may be modified in accordance with FIG. 2 for obtaining the outer fillets 66 as a double fillet together with the inner fillets. In this case, the third tool 29 forms the end of the tool series and between it and the second tool 14 is inserted a scraping tool 48, which has a pair of scraping fingers 49, each of which is arranged on the free end of a lever 50 and gives way upwards against a not shown spring. The scraping fingers 49 have ends 51 projecting upwardly in hook-like manner, which ends are secured in inclined manner in the conveying direction. The other end of the lever 50 is fixed to a vertical axis 52, on which engages a drive bringing about the rotation thereof and being designed as a pneumatically operated swivel or pivot cylinder 53, which is able to elastically pivot the scraping fingers 49 between a position alongside the path of the poultry body and a position crossing the same.

Figure 3:
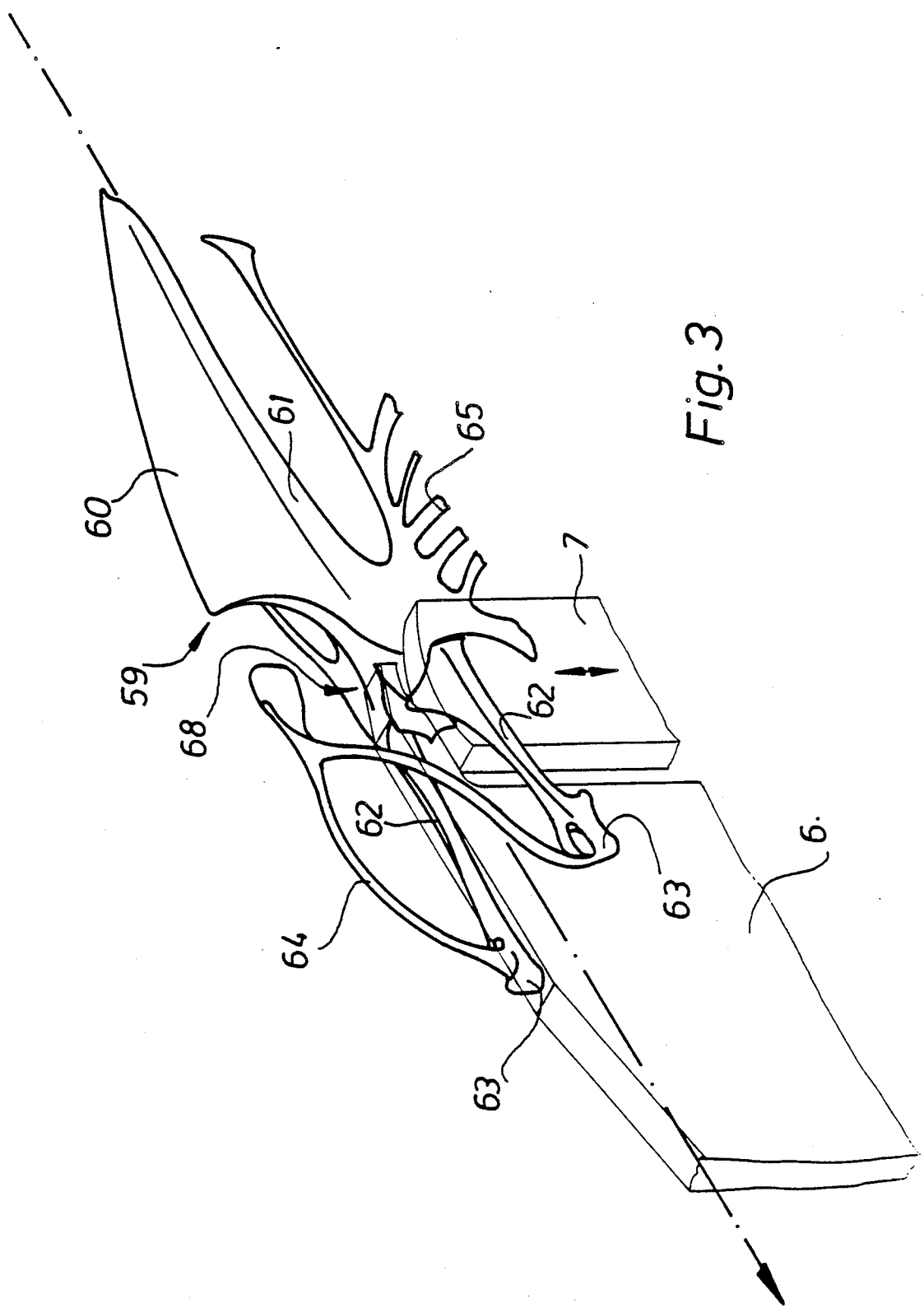
FIG. 3 is an axonometric view of the skeleton of part of the poultry body termed as the breast cap.

The apparatuses operate as follows:

A poultry body 58 prepared in accordance with FIG. 3 and 4, i.e. which has been freed from its extremities and commercially known as a breast cap, immediately upon passing of a receptacle 5 within the loading area of the apparatus according to FIG. 1 is placed on the guide profile 1 with the breast-bone 59 upwards and with the wing joints 63 pointing forwards, so that the outer parts of the inside of the breast-bone plate 61 rest on the roof-shaped support surfaces of the guide profile 1. The breast cap 58 is then moved against the continuously moving receptacle 5, so that the saddle part 6 thereof with its horn-like extension runs between the branches of the wish-bone 64 and onto the part of the breast-bone plate 61 positioned upstream of the crest 60 of the breast-bone 59 whilst engaging over the same. In the meantime the receptacle 5 has approached the working area of the tools for cutting the meat from the skeleton, so that the clamping part 7 of receptacle 5 has been raised by running onto a not shown, frame-fixed curved or cam rail and consequently the breast cap 58 is secured. The breast cap 58 securely held in this way now passes into the area of the first tool 8, whose function is to detach the outer fillets 66 from the coracoid bones 62 and any ribs 65 which may be present, as well as the connection between the outer fillets 66 and the inner fillets 67. This is brought about by controlled movement of the scrapers 12 kept pivoted out of the path of the poultry body 58 by corresponding activation of the pivot cylinders 13, so that the scrapers 12 are introduced into the meat directly behind the wing joints 63 and between the wish-bone 64 and the coracoid bones 62. This process is indicated by the illustration of FIG. 5. The correct time for the controlled movement of the scrapers 12 can be determined by adjusting a not shown switching element, whose operation takes place by the passage of the receptacle 5. The control of the following tools can take place in the same Way. Processed in this way breast cap 58 passes into the region of the second tool 14, Which initially penetrates with the guide elements 15 or their ends 18 into the joint surface formed and at the same time lifts the outer fillets 66 according to FIG. 6. As a result of the inclination of the guide elements 15 and their oppositely effective elasticity, the outer fillets 66 are drawn upwards under a certain tension, so that their outer faces undergo reciprocal engagement. In this tensioned state the aCtion field of the severing tool 21 is reached, whose paring knives 22 with their sharpened paring edges 23 initially cut through the connection between the outer fillets 66 and the wing joints 63. This separating cut passes into a paring process, in which the outer fillets 66 are stripped from the wish-bone 64 which, during this process and as a result of its inherent tension, is urged against the underside of the baring edges 23. At the instant when the paring knives 22 reach the crest 60 of the breast-bone 59, they are moved under control out of engagement by a corresponding activation of the pivot cylinders 28, so that the outer fillets 66 are now only connected to the skeleton at the sides of the crest 60 of the breast-bone 59. This connection is severed by means of the following retaining device 30, whose clamping elements 31 penetrate into the previously produced severing surface and hold both outer fillets 66 in the wedge-shaped clamping gap 36, so that, whilst exerting a certain scraping effect as conveying advances, they are detached from the sides of the comb 60 of the breast-bone 59 by tearing-off (cf. FIG. 7). As a result there is obtained a double fillet embracing the two outer fillets 66 and which is released prior to the arrival of the next receptacle 5 by briefly opening the retaining device 30 through a corresponding activation of the pivot cylinder 34. The now largely exposed skeleton, which only carries the inner fillets 67, subsequently passes into the action area of the tool 37, whose friction elements 39 engage under slight pressure on the inner fillets 67, as a result of the activation of drive 38. As a result of the relative movement between the friction element 39 and the inner fillet 67, which movement is produced by the conveying, the skin surrounding the fillet is destroyed. so that the subsequent stripping of the inner fillets 67 is facilitated. Stripping takes place with the aid of the tool 40, whose scrapers 41 are moved in controlled manner into the path of the skeleton directly after the passage of the wing joints 63 as a result of a corresponding activation of the drive 44. As shown in FIG. 8, the inner fillets 67 are scraped from the crest 60 and the breast-bone plate 61 by said scrapers 41.

It is possible to obtain the outer fillets 66 and the inner fillets 67 in one piece by converting the apparatus into that of FIG. 2. The scrapers 12 of the first tool 8 are set somewhat lower and the scraping tool 48 is installed following the same. Controlled movement takes place directly after the passage of the wing joints 63, whereby the scraping fingers 49 penetrate the separation surface created by the scrapers 12 of the first tool 8 and detach the inner fillets 67 and also the outer fillets 66 from the flanks of the crest 60 of the breast-bone 59. The tool 14 follows in unchanged arrangement, and following the operation thereof the poultry meat is released in the form of a double outer fillet embracing the inner fillets 67 by means of the also unchanged retaining device 30.

As a result of the arrangement of the processing tools in association with the lower strand of the conveyor 3 the possibility arises of an overhead processing of the poultry bodies which with the cooperation of gravity, can lead to a better collection or lifting of the meat parts detached and the guidance thereof, as well as a simplification of the corresponding elements.

What is claimed is

1. A method for mechanically obtaining meat from bodies of slaughtered poultry comprising a body-cavity-surrounding skeleton and meat on said skeleton, which bodies include two inner and outer fillets of meat, each, and define a longitudinal direction, in which method said bodies are present in a form freed from their extremities and said skeleton essentially comprises a breast-bone (sternum) constituted by a crest (crista sterni) and a breast-bone plate (corpus sterni), and wing joints carried by coracoid bones (coracoidae) and carrying a wishbone (clavicula). as well as at least parts of ribs possibly present, depending on previous preparation in the course of slaughtering, which bodies are conveyed in a conveying direction through a series of processing stations with said wing joints leading and in said longitudinal direction with an orientation of the part of said breast-bone plate (corpus sterni) facing said body cavity substantially parallel to said conveying direction, said method including the steps of (a) detaching said outer fillets from said coracoid bones and any of said ribs present, as well as severing connections present between said outer fillets and said inner fillets, essentially up to said crest (crista sterni) of said breast-bone;
(b) severing a connection present between said outer fillets and said wing joints while detaching said outer fillets from said wishbone;
(c) tearing off in one piece said two outer fillets from crest;
(d) tearing skin surrounding said inner fillets; and
(e) stripping said inner fillets from said skeleton.

2. A method for mechanically obtaining meat from bodies of slaughtered poultry comprising a body-cavity-surrounding skeleton and meat on said skeleton, which bodies include two inner and outer fillets of meat, each, and define a longitudinal direction, in which method said bodies are present in a form freed from their extremities and said skeleton essentially comprises a breast-bone (sternum) constituted by a crest (crista sterni) and a breast-bone plate (corpus sterni), and wing joints carried by coracoid bones (coracoidae) and carrying a wishbone (clavicula), as well as at least parts of ribs possibly present, depending on previous preparation in the course of slaughtering, which bodies are conveyed in a conveying direction through a series of processing stations with said wing joints leading and in said longitudinal direction with an orientation of the part of said breast-bone plate (corpus sterni) facing said body cavity substantially parallel to said conveying direction, said method including the steps of
(a) detaching said outer fillets and said inner fillets from said coracoid bones and any of said ribs present, essentially up to said crest (crista sterni) of said breast-bone;
(b) detaching said meat from the sides of said crest;
(c) severing a connection present between said outer fillets and said wing joints while detaching said outer fillets from said wishbone; and
(d) tearing off in one piece said two outer fillets together with said two inner fillets from said crest of said breast-bone.

3. An apparatus for mechanically obtaining meat from bodies of slaughtered poultry comprising a body-cavity-surrounding skeleton and meat on said skeleton, which bodies include two inner and outer fillets of meat, each, and define a longitudinal direction, in which method said bodies are present in a form freed from their extremities and said skeleton essentially comprises a breast-bone (sternum) constituted by a crest (crista sterni) and a breast-bone plate (corpus sterni), and wing joints carried by coracoid bones (coracoidae) and carrying a wishbone (clavicula), as well as at least parts of ribs possibly present, depending on previous preparation in the course of slaughtering, which bodies are conveyed in a conveying direction past a series of processing tools with said wing joints leading and in said longitudinal direction With an orientation of the part of said breast-bone plate (corpus sterni) facing said body cavity substantially parallel to said conveying direction, said apparatus comprising a continuously moved conveyor provided with receptacles for holding the poultry bodies to be processed and for conveying them along a body path, as well as tools for releasing the meat from the skeleton and arranged along said conveyor path, said apparatus comprising
(a) first tool means for detaching said outer fillets from said coracoid bones and any of said ribs present, as well as severing connections present between said outer fillets and said inner fillets, essentially up to said crest (crista sterni) of said breast-bone;
(b) second tool means for severing a connection present between said outer fillets and said wing joints while detaching said outer fillets from said wishbone;
(c) third tool means for tearing off in one piece said two outer fillets from crest;
(d) fourth tool means for tearing skin surrounding said inner fillets; and
(e) fifth tool means for stripping said inner fillets from said skeleton.

4. An apparatus as claimed in claim 3, wherein said first tool means are provided for detaching said outer fillets from said coracoid bones and any of said ribs present, as well as severing connections present between said outer fillets and said inner fillets, essentially up to said crest (crista sterni) of said breast-bone, which first tool means are designed as a scraping tool, which comprises at least one set of scrapers, arranged symmetrically on facing sides alongside said body path and adapted to move in a controlled manner into said path, the controlled movement into said path taking place immediately behind the wing joints and between said wish-bone and said coracoid bone, respectively.

5. An apparatus as claimed in claim 4, wherein each of said scrapers comprises a scraping finger adapted to the outer cross-sectional contour of the respective operational area of said skeleton associated with said particular one of said scrapers and which is mounted to be upwardly and outWardly displaceable resiliently and is designed to be vertically adjustable relative to said body.

6. An apparatus as claimed in claim 3 wherein said second tool means comprise guide elements for lifting said detached fillet parts and arranged symmetrically in rising manner on either side of the poultry body path, said guide elements being held in outwardly displaceable manner against spring tension; as well as a cutting tool including scraping knives arranged in the region of said guide elements immediately below the latter and designed to move outwardly, under control, from a position crossing said body path at the instant of the arrival of said crest of said breast-bone.

7. An apparatus as claimed in claim 3, wherein said third tool means comprise a retaining device arranged symmetrically to and over said poultry body path and comprising at least one set of clamping elements forming a tapering clamping gap between them, folding upwards said detached fillet parts about the ridge area of said crest and arranged to move, in controlled manner, out of said body path following the passage of said body.

8. An apparatus as claimed in claim 3, wherein said fourth tool means comprise a set of friction elements arranged symmetrically alongside said poultry body path and designed to be lowered onto said inner fillets under a predetermined pressure at the instant of said body entering the region of said friction elements.

9. An apparatus as claimed in claim 3, wherein said fifth tool means comprise a set of scrapers arranged symmetrically to said poultry body path and defining scraping edges, which are adapted to the cross-sectional contour of said skeleton in the region of said crest and said breast-bone plate and designed to move in controlled manner into said poultry body path immediately following the passage of said wing joints, said edges being able to yield resiliently in an outward direction during said movement.

10. An apparatus as claimed in claim 3, wherein at least said second tool means as well as any of said tool means following said second tool means are arranged along a lower run of said conveyor.

11. An apparatus for mechanically obtaining meat from bodies of slaughtered poultry comprising a body-cavity-surrounding skeleton and meat on said skeleton, which bodies include two inner and outer fillets of meat, each, and define a longitudinal direction, in which method said bodies are present in a form freed from their extremities and said skeleton essentially comprises a breast-bone (sternum) constituted by a crest (crista sterni) and a breast-bone plate (corpus sterni), and wing joints carried by coracoid bones (coracoidae) and carrying a wish-bone (clavicula), as well as at least parts of ribs possibly present, depending on previous preparation in the course of slaughtering, which bodies are conveyed in a conveying direction past a series of processing tools with said wing joints leading and in said longitudinal direction with an orientation of the part of said breast-bone plate (corpus sterni) facing said body cavity substantially parallel to said conveying direction, said apparatus comprising a continuously moved conveyor provided with receptacles for holding the poultry bodies to be processed and for conveying them along a body path, as well as tools for releasing the meat from the skeleton and arranged along said conveyor path, said apparatus comprising
  (a) a first tool arrangement for detaching said outer fillets and said inner fillets from said coracoid bones and any of said ribs present, essentially up to said crest (crista sterni) of said breast-bone; followed by
  (b) an intermediate tool arrangement for detaching said meat from the sides of said crest;
  (c) a second tool arrangement for severing a connection present between said outer fillets and said wing joints while detaching said outer fillets from said wish-bone; and
  (d) a third tool arrangement for tearing off in one piece said two outer fillets together with said two inner fillets from said crest of said breast-bone.

12. An apparatus as claimed in claim 11, wherein said first tool arrangement is designed as a scraping tool, which comprises at least one set of scrapers, arranged symmetrically on facing sides alongside said body path and adapted to move in a controlled manner into said path, the controlled movement into said path taking place immediately behind the wing joints and between said wish-bone and said coracoid bone, respectively.

13. An apparatus as claimed in claim 12, wherein each of said scrapers comprises a scraping finger adapted to the outer cross-sectional contour of the respective operational area of said skeleton associated with said particular one of said scrapers and which is mounted to be upwardly and outwardly displaceable resiliently and is designed to be vertically adjustable relative to said body.

14. An apparatus as claimed in claim 11, wherein said intermediate tool arrangement is constructed as a scraping tool Which is designed to be moved under control into the detachment area provided by said first tool arrangement and includes scraping fingers having ends projecting upwardly in hook-like manner and which are arranged to yield resiliently vertically and outwardly.

15. An apparatus as claimed in claim 11, wherein said second tool arrangement comprises guide elements for lifting said detached fillet parts and arranged symmetrically in rising manner on either side of the poultry body path, said guide elements being held in outwardly displaceable manner against spring tension; as well as a cutting tool including scraping knives arranged in the region of said guide elements immediately below the latter and designed to move outwardly, under control, from a position crossing said body path at the instant of the arrival of said crest of said breast-bone.

16. An apparatus as claimed in claim 11, wherein said third too arrangement comprises a retaining device arranged symmetrically to and over said poultry body path and comprising at least one set of clamping elements forming a tapering clamping gap between them, folding upwards said detached fillet parts about the ridge area of said crest and arranged to move, in controlled manner, out of said body path following the passage of said body.

17. An apparatus as claimed in claim 11 wherein at least said second tool arrangement as well as any tool arrangement following said second tool arrangement are arranged along a lower run of said conveyor.

* * * * *